June 29, 1937.  M. S. FISH  2,085,645
FARM FLOAT
Filed Jan. 5, 1937  2 Sheets-Sheet 1
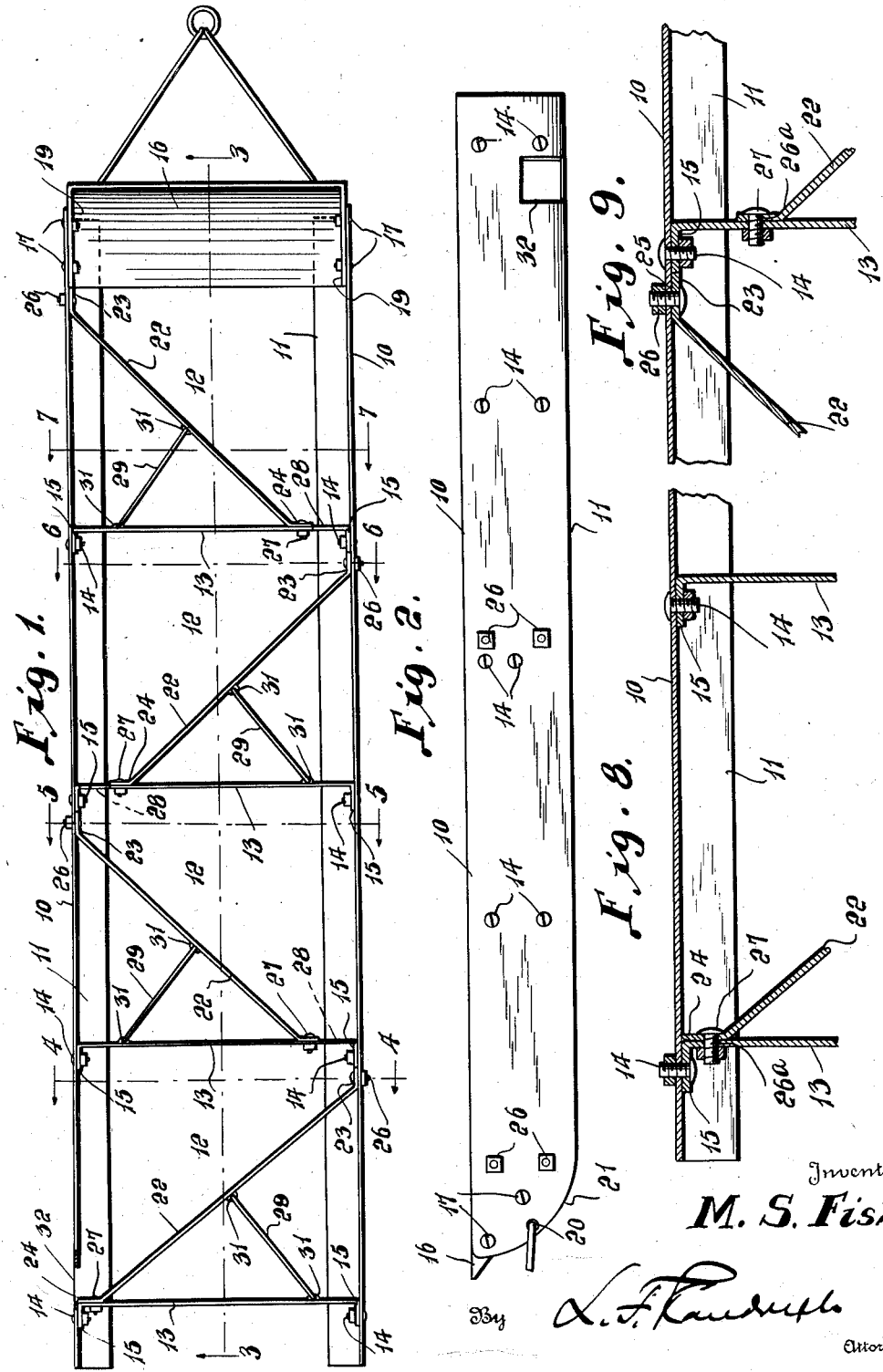
Inventor
M. S. Fish
By
Attorney June 29, 1937.  M. S. FISH  2,085,645
FARM FLOAT
Filed Jan. 5, 1937  2 Sheets-Sheet 2
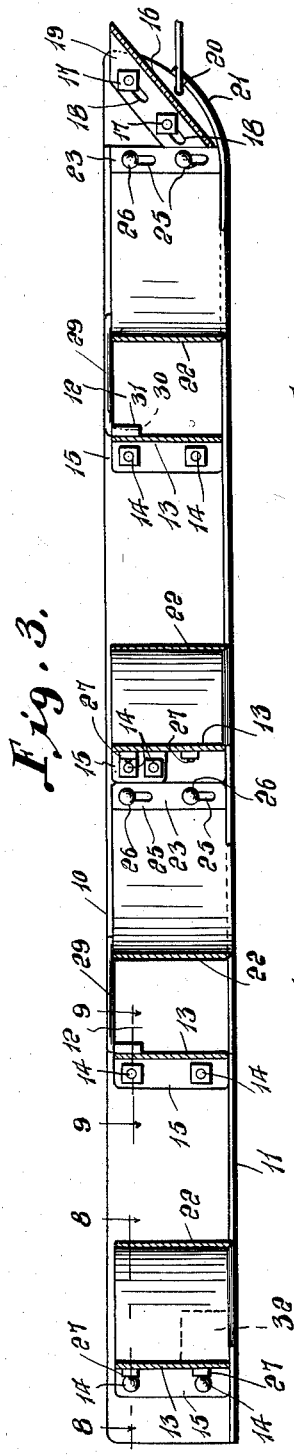
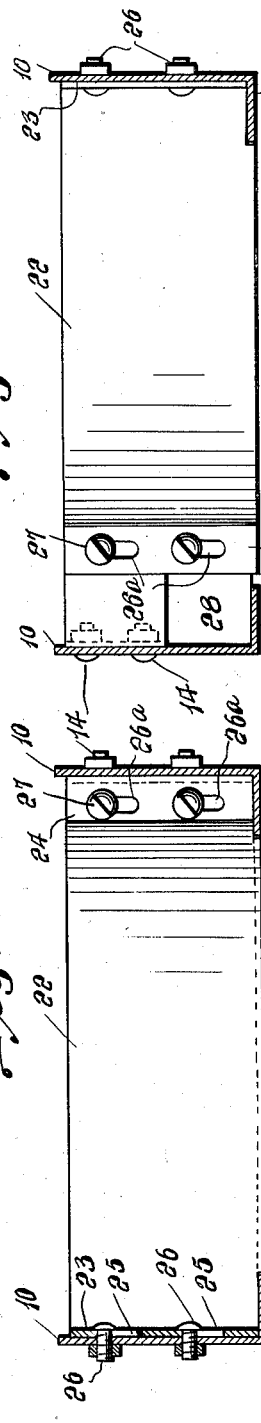
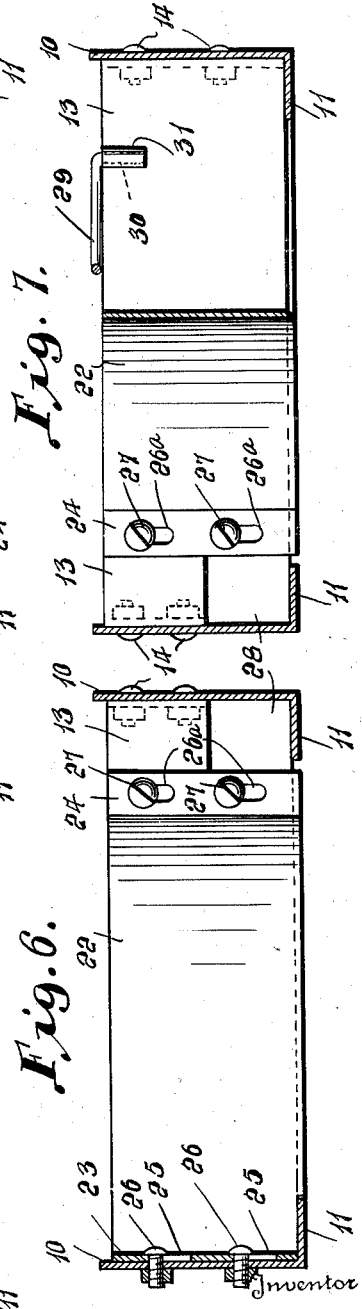
Inventor
M. S. Fish
By L. F. Randolph
Attorney Patented June 29, 1937

2,085,645

UNITED STATES PATENT OFFICE 2,085,645

FARM FLOAT

Mortimer Samuel Fish, Stuttgart, Ark.

Application January 5, 1937, Serial No. 119,145

5 Claims. (Cl. 55—22)

This invention relates to a farm float or implement adapted to be drawn over a field immediately after plowing thereof in order to level the soil by filling up the deep furrows, taking the high portions or bumps thereof and shifting the same to the lower spaces, and yet without unduly packing or pulverizing the soil.

I find that the invention will operate in ground or soil as wet as will permit the operation of a tractor and I further find that the device saves time and the expense of disking and harrowing plowed ground.

The more specific objects and advantages will become apparent from a consideration of the description following taken in connection with accompanying drawings illustrating an operative embodiment.

In said drawings:—

Figure 1 is a plan view of the implement;

Figure 2 is a side elevation thereof;

Figure 3 is a longitudinal sectional view taken on the line 3—3 of Figure 1;

Figure 4 is a cross sectional view taken on the line 4—4 of Figure 1;

Figure 5 is a cross sectional view taken on the line 5—5 of Figure 1;

Figure 6 is a cross sectional view taken on the line 6—6 of Figure 1;

Figure 7 is a cross sectional view taken on the line 7—7 of Figure 1;

Figure 8 is a horizontal sectional view taken on the line 8—8 of Figure 3, and

Figure 9 is a horizontal sectional view taken on the line 9—9 of Figure 3.

Referring specifically to the drawings wherein like reference characters designate like or similar parts, the implement comprises parallel side bars or beams 10, preferably but not necessarily made of metal and they are provided with ground runners 11 as in the form of inturned flanges. The implement is provided with any desired number of spaces 12 having division walls or partitions 13 therebetween, bolted or otherwise rigidly fastened as at 14 to the beams 10, the bolts passing through the latter and through flanges 15 at the ends of the partitions.

At the forward end of the implement, an inclined blade 16 is provided which is adjustably fastened to and between the beams 10, by means of bolts 17 passing through elongated slots 18 in flanges 19 at the ends of the blade. The beams 10 project forward slightly beyond the blade 16 and have openings 20 therethrough to which any suitable hitch may be made for the draft of the implement by a tractor, animal power or the like. It will be noted that the runners 11 are curved upwardly at their forward ends as at 21.

In each of the compartments 12, a deflector wall 22 is provided, such walls being diagonally disposed alternately at substantially right angles to each other whereby they are in a zigzag path. Such deflectors 22 have flanges 23 and 24, the former being provided with elongated slots 25 through which bolts 26 pass to adjustably secure them to the beams 10. The flanges 24 however terminate short of the adjacent beam 10 and have elongated slots 26ª through which bolts 27 pass adjustably securing them to the partitions 13. Each of the partitions 13 at the lower edge, between the flanges 24 and adjacent beam 10 has openings 28 therethrough.

Brace elements may be provided as at 29 having depending terminals 30, engaged in sockets 31 provided on the partitions 13 and the deflectors 22.

As the device is drawn over the ground after plowing, the runners 11 travel on the ground and the soil will be shifted by the walls 10 and the deflectors 22, the high portions of the soil being moved into the lower spaces without packing the soil and without unduly pulverizing it. Such soil as is trapped between the walls or beams 10 will engage the same and the deflectors 22, thereby taking a tortuous course through the implement, passing through the staggered openings 28, being leveled off and if any remains, escaping from or leaving the last compartment 12 through an opening 32 in one of the side beams.

Various changes may be resorted to provided they fall within the spirit and scope of the invention.

I claim as my invention:—

1. An implement of the class described having side beams, partitions between the side beams, deflectors in an alternate path connected to the side beams and the partitions, said partitions having openings therethrough for passage of soil from one deflector to another, and the final compartment having an escape opening through one of the side beams.

2. An implement of the class described having side beams, partitions between the side beams, deflectors in an alternate path connected to the side beams and the partitions, said partitions having openings therethrough for passage of soil from one deflector to another, the final compartment having an escape opening through one of the side beams, said deflectors having elongated slots, and bolts adjustably passing through the slots and the adjacent side beams and partitions.

3. An implement of the class described having side beams, partitions between the side beams, deflectors in an alternate path connected to the side beams and the partitions, said partitions having openings therethrough for passage of soil from one deflector to another, and the final compartment having an escape opening through one of the side beams, an inclined blade at the forward end of the implement attached to the beams.

4. An implement of the class described having side beams, partitions between the side beams, deflectors in an alternate path connected to the side beams and the partitions, said partitions having openings therethrough for passage of soil from one deflector to another, the final compartment having an escape opening through one of the side beams, said deflectors having elongated slots, bolts adjustably passing through the slots and the adjacent side beams and partitions, an inclined blade at the forward end of the implement having elongated slots, and bolts adjustably passing through said slots and securing the blade to the beams, and braces between the deflectors and partitions, and sockets on the deflectors and partitions removably engaged by end portions of the braces.

5. An implement of the class described comprising spaced runners, spacing members arranged between said runners, diagonal members secured to said runners and spacing members in alternate positions, and said spacing members provided with alternately arranged openings.

MORTIMER S. FISH.